(12) United States Patent
La Vecchia et al.

(10) Patent No.: US 10,023,111 B2
(45) Date of Patent: Jul. 17, 2018

(54) ILLUMINATION DEVICE, IN PARTICULAR IN A VEHICLE

(71) Applicants: Erminia La Vecchia, Ascona (CH); Carmine La Vecchia, Ascona (CH)

(72) Inventors: Erminia La Vecchia, Ascona (CH); Carmine La Vecchia, Ascona (CH)

(*) Notice: Subject to any disclaimer, the term of this patent is extended or adjusted under 35 U.S.C. 154(b) by 42 days.

(21) Appl. No.: 15/116,651

(22) PCT Filed: Jan. 30, 2015

(86) PCT No.: PCT/EP2015/051936
§ 371 (c)(1),
(2) Date: Aug. 4, 2016

(87) PCT Pub. No.: WO2015/124408
PCT Pub. Date: Aug. 27, 2015

(65) Prior Publication Data
US 2016/0347245 A1    Dec. 1, 2016

(30) Foreign Application Priority Data
Feb. 19, 2014 (EP) .................................. 14155800

(51) Int. Cl.
*G01D 11/28* (2006.01)
*B60Q 3/54* (2017.01)
*B60Q 3/217* (2017.01)
*B60Q 3/225* (2017.01)
(Continued)

(52) U.S. Cl.
CPC ................. *B60Q 3/54* (2017.02); *B60Q 3/14* (2017.02); *B60Q 3/217* (2017.02); *B60Q 3/225* (2017.02); *B60Q 3/78* (2017.02); *B60Q 2500/10* (2013.01)

(58) Field of Classification Search
CPC ... B60Q 3/14; B60Q 3/54; B60Q 3/78; B60Q 3/217; B60Q 2500/10
See application file for complete search history.

(56) References Cited

U.S. PATENT DOCUMENTS

| 5,997,161 A | 12/1999 | Stringfellow et al. |
| 6,883,926 B2 | 4/2005 | Wojnarowski |
| 7,052,152 B2 | 5/2006 | Harbers et al. |

(Continued)

FOREIGN PATENT DOCUMENTS

| DE | 19859195 | * 12/1998 |
| DE | 19859195 A1 | 6/2000 |

(Continued)

OTHER PUBLICATIONS

Abstract of DE 102005005682.
(Continued)

*Primary Examiner* — Ali Alavi
(74) *Attorney, Agent, or Firm* — Brian Roffe

(57) ABSTRACT

Illumination device, in particular in a vehicle, wherein certain areas in the interior of the vehicle, such as center console, dashboard, and/or side doors, are at least partially covered by real wood elements that are translucent. Illumination units are arranged on the underside of the wood elements and the wood elements can be used to produce differently shaped illuminations with a defined orientation in the vehicle interior. The wood elements have a thickness such that the illumination units are not visible to an occupant when switched off, i.e., not emitting light.

20 Claims, 2 Drawing Sheets

(51) Int. Cl.
*B60Q 3/78* (2017.01)
*B60Q 3/14* (2017.01)

(56) References Cited

U.S. PATENT DOCUMENTS

| | | | |
|---|---|---|---|
| 7,276,854 | B1 | 10/2007 | Deutsch et al. |
| 7,316,494 | B2 | 1/2008 | Eichhorn et al. |
| 7,431,484 | B2 | 10/2008 | Fong |
| 8,016,465 | B2 * | 9/2011 | Egerer .................... B60R 13/02 362/23.01 |
| 8,506,141 | B2 * | 8/2013 | Cannon ............... B60R 13/0212 362/490 |
| 9,187,034 | B2 * | 11/2015 | Tarahomi ................ B60R 13/02 |
| 2003/0081411 | A1 | 5/2003 | Noda et al. |
| 2006/0087826 | A1 | 4/2006 | Anderson, Jr. |
| 2007/0177397 | A1 | 8/2007 | Sakakibara et al. |
| 2007/0240346 | A1 | 10/2007 | Li et al. |
| 2009/0129007 | A1 | 5/2009 | Egerer et al. |
| 2009/0219730 | A1 | 9/2009 | Syfert et al. |

FOREIGN PATENT DOCUMENTS

| | | |
|---|---|---|
| DE | 19909472 A1 | 9/2000 |
| DE | 10159954 A1 | 4/2003 |
| DE | 102005005682 * | 8/2006 |
| DE | 102005005682 A1 | 8/2006 |
| DE | 19835279 A1 | 2/2010 |
| DE | 102009031820 A1 | 2/2010 |
| DE | 1020090055427 A1 | 7/2011 |
| DE | 102012216665 * | 9/2012 |
| EP | 2060444 A1 | 8/2010 |
| EP | 2218610 A1 | 8/2010 |
| FR | 2886238 A1 | 12/2006 |
| WO | 20150124408 A1 | 8/2015 |

OTHER PUBLICATIONS

Abstract of DE 19859195.
Abstract of EP 2060444.
Abstract of DE 102009031820.
Asbtract of FR 2886238.
Abstract of DE 102009055427.
Abstract of DE 19909472.
Abstract of EP 2218610.
Abstract of DE 10159954.
Abstract of DE 19835279.

* cited by examiner

# ILLUMINATION DEVICE, IN PARTICULAR IN A VEHICLE

FIELD OF THE INVENTION

The invention relates to an illumination device, in particular in a vehicle, wherein certain areas in the interior, such as the center console, the dashboard and/or the side doors, are at least partially covered by real wood elements, and illumination means are arranged on the underside of the wood elements and used to produce visible illumination in the interior compartment of the vehicle.

BACKGROUND OF THE INVENTION

In an interior construction part of a motor vehicle according to publication DE-A-198 35 279, a lining element, made for example of wood, is provided as lining of the interior. In order to illuminate the interior, it is proposed to integrate an electric light element which advantageously extends along the entire lining element and is made in laminar form. It is held here on a support part and can be made in various embodiments. However, this illumination is visible and not especially aesthetic because it also brings about separation of the lining element.

OBJECT AND SUMMARY OF THE INVENTION

In contrast, the object of the present invention was to improve an illumination device in a vehicle such that it results in an exceptionally aesthetic and discreet effect for the occupants, and the surface regions with the wood elements can also be designed optimally.

According to the invention, this object is achieved by an illumination device including a translucent wood element on a vehicular component exposed to an interior compartment of the vehicle, an elongate housing arranged on an underside of the wood element and open on a side adjacent the wood element, and light emitting diodes (LEDs) arranged one behind another and spaced apart from one another in the elongate housing to form, when emitting light, a linear illumination that is visible in the interior compartment through the wood element, the LEDs not being visible to an occupant when not emitting light.

By arranging the illumination means on the underside of the wood elements, a plurality of linear or similar illuminations can be formed in a defined orientation, the wood elements having a thickness such that these illumination means are not visible to an occupant when switched off.

Therefore, very discreet illumination is created in a vehicle for the driver and also for the other occupants which additionally gives visual accents and can, moreover, be realized by different versions.

In one very advantageous embodiment, these illumination means, in the form of LED lights, are arranged spaced apart from one another such that these lights that can be produced in lines appear without interruption on the upper side of the wood elements. A particularly elegant design is thus produced.

BRIEF DESCRIPTION OF THE DRAWINGS

Exemplary embodiments of the invention and further advantages of the latter are described in more detail below by means of the drawings. These show as follows.

DETAILED DESCRIPTION OF THE INVENTION

Figure 1:
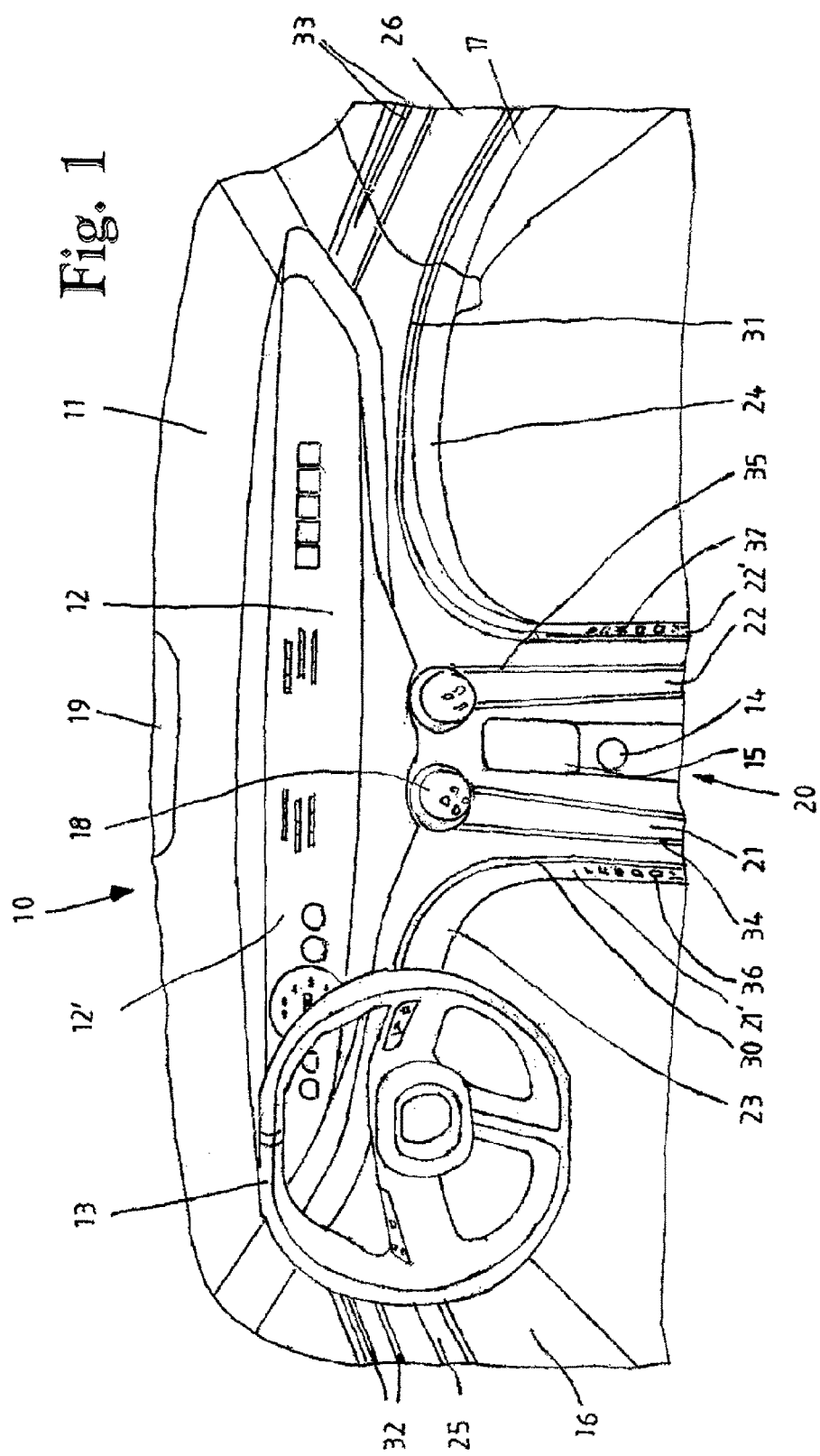
FIG. 1 is a partial view of a vehicle interior with an illumination device according to the invention.

FIG. 1 shows an interior 10 of a vehicle of which the front side with the steering wheel 13 and the dashboard 12 with the display 12', the center console 20 and, moreover, partially the side doors 16, 17 can be seen. A front surface 11 and ventilation screen 19 are also visible. The vehicle is a passenger car. However, this interior could of course also be created in the same way in a bus, a truck or also in a ship or an aircraft.

The illustrated center console 20 in the front part, the dashboard 12 and the side doors 16, 17 of the interior 10 are lined with real wood elements 21 to 26 which form a curved shape and extend here along the center console 20, curving outwards at the front on the dashboard 12 and along the side doors.

According to the invention, an illumination device is provided in the vehicle interior by means of which a plurality of illuminations 30 to 33 that can be produced are formed with a defined orientation by illumination means on the underside of the wood elements 21 to 26 so that elegant décor illumination in the vehicle interior 10 is made possible, the wood elements 21 to 26 having a thickness such that these illumination means are not visible to an occupant when switched off.

These illuminations 30 to 33 are respectively provided at the driver and at the passenger seat and are characterized in that they produce almost continuous linear illumination that extends along the center console 20, in an outward curve at the front on the dashboard 12 and along the side doors 16, 17. In the region of the center console 20, these illuminations 30, 31 run on both sides along the edge of the wood elements 21, 22 along their outer side at the driver and at the passenger seat respectively. At the front, they then pass outwardly into the curved shape on the dashboard 12.

Provided on the center console 20 as well as these edge-side illuminations 30, 31, are two additional, linear illuminations 34, 35 spaced apart from one another, which run approximately parallel to one another and are also assigned both to the driver and to the passenger seat. These illuminations are respectively guided at the front to the outsides of a knob 18.

Furthermore, within the framework of the invention, illuminations respectively facing the driver and the passenger are provided on the center console 20 in the form of control buttons 36, 37 lined up alongside one another. These control buttons 36, 37 are respectively positioned on a wooden strip 21', 22' extending along the center console 20 at an angle to the flat wood elements 21, 22 such that said control buttons can be operated manually by the occupant in a comfortable and well visible manner. Furthermore, a switch 14 for switching the engine on and off and a docketing station for a smartphone 15 or the like are also indicated.

On the rear side of the wooden strips 21', 22', illumination means and, moreover, push buttons are also positioned at these control buttons 36, 37. By means of finger pressure on the control buttons 36, 37 illuminated on the wooden strips 21', 22', the corresponding function, indicated by icons, such as for example the lowering or raising of windows, opening of the tailgate, adjustment of the seat or the backrest etc. can be triggered.

These real wood elements 21 to 26 and wooden strips 21', 22' are produced as veneers made of high quality wood with natural grains. In addition, these real wood elements are preferably provided at the top with a layer of glaze so that they are impermeable to liquid. The thicknesses of these wood elements can be between a few tenths of a millimeter to a few millimeters. These thicknesses are chosen such that on the one hand their strength is sufficient and on the other hand this translucency is achieved optimally.

Figure 2:
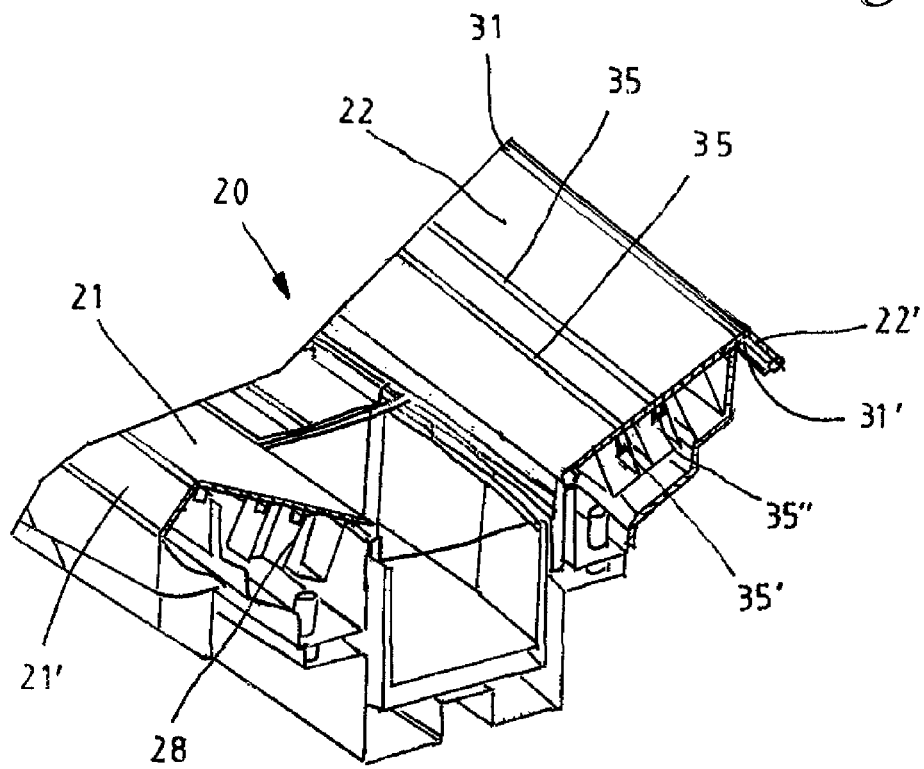
FIG. 2 is a cross-section of the center console in the vehicle, shown partially in perspective.

According to FIG. 2, these wood elements 21, 22 and the wooden strips 21', 22' on the center console 20 are supported on their rear side on carrier profiles 28, 29 in which these illumination means 31', 35', 35", each comprising a number of LED lights arranged one behind the other, are contained. The LED lights are spaced apart from one another here such that these illuminations, which can be produced in a line, appear without interruption on the upper side of the wood elements 22. In addition, they are advantageously in the form of RGBs so that they can also generate different luminous colours.

Figure 3:
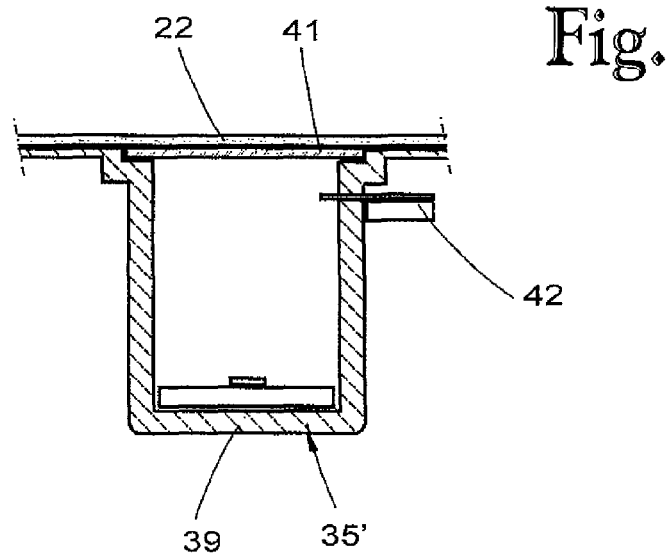
FIG. 3 is an enlarged cross-section of illumination means according to FIG. 2.

FIG. 3 shows in detail an illumination means 35' which is respectively contained in an elongate housing 39 in order to form the linear illumination and above the latter the wood element 22 in the form of a veneer is provided with a correspondingly translucent thickness. Furthermore, a strip 41 made of a light diffusing material, such as Plexiglas, is preferably disposed beneath the wood element 22, and this additionally guarantees that even illumination is produced over the wood element. Furthermore, a capacitive switch 42 is provided on the housing 39.

The invention is sufficiently displayed by the above exemplary embodiment. However, it could also be illustrated by other variations. Thus, other and different alignments of the illuminations could be provided. Basically any other luminescent illumination means could be used instead of LED lights.

The invention claimed is:

1. An illumination device in a vehicle, comprising:
    a wood element on a vehicular component exposed to an interior compartment of the vehicle, the wood element having a thickness that causes it to be translucent,
    an elongate housing arranged on an underside of the wood element and being open on a side adjacent the wood element, and
    a plurality of light emitting diodes (LEDs) arranged one behind another and spaced apart from one another in the elongate housing to form, when emitting light, a linear illumination that is visible in the interior compartment of the vehicle through the wood element,
    the LEDs not being visible to an occupant in the interior compartment of the vehicle when not emitting light.

2. The illumination device according to claim 1, further comprising at least one strip of light diffusing material between the LEDs and the wood element, whereby the at least one strip aids in producing even illumination over the wood element.

3. The illumination device according to claim 2, wherein the at least one strip of light diffusing material comprises plexiglass.

4. The illumination device according to claim 1, wherein the wood element is a real wood element having a curved shape.

5. The illumination device according to claim 1, wherein the wood element is on a side door of the vehicle which is the vehicular component.

6. The illumination device according to claim 1, wherein the wood element is on a dashboard of the vehicle which is the vehicular component.

7. The illumination device according to claim 1, wherein the LEDs are contained in the elongate housing.

8. The illumination device according to claim 1, further comprising:
    at least one additional wood element on a vehicular component exposed to the interior compartment of the vehicle, each of the at least one additional wood element having a thickness that causes it to be translucent,
    at least one additional elongate housing each arranged on an underside of a respective one of the at least one additional wood element and being open on a side adjacent the respective one of the at least one additional wood element, and
    a plurality of light emitting diodes (LEDs) arranged one behind another and spaced apart from one another in each of the at least one additional elongate housing to form, when emitting light, a linear illumination that is visible in the interior compartment of the vehicle through the respective one of the at least one additional wood element, the LEDs not being visible to an occupant in the interior compartment of the vehicle when not emitting light.

9. The illumination device according to claim 8, wherein the LEDs form differently shaped illuminations.

10. The illumination device according to claim 8, wherein the LEDs form differently shaped illuminations with defined orientations.

11. The illumination device according to claim 1, wherein the wood element has a front surface exposed to the interior compartment of the vehicle.

12. The illumination device according to claim 1, wherein the LEDs are spaced apart from one another to produce, when emitting light, illuminations in lines without interruption on an upper side of the wood element facing the interior compartment of the vehicle.

13. The illumination device according to claim 1, wherein the wood element is on a center console of the vehicle which is the vehicular component.

14. The illumination device according to claim 13, further comprising:
    a first additional wood element on a dashboard of the vehicle exposed to the interior compartment of the vehicle, the first additional wood element having a thickness that causes it to be translucent,
    a first additional elongate housing arranged on an underside of the first additional wood element on the dashboard and being open on a side adjacent the first additional wood element, and
    a plurality of light emitting diodes (LEDs) arranged one behind another and spaced apart from one another in the first additional elongate housing to form, when emitting light, a linear illumination that is visible in the interior compartment of the vehicle through the first additional wood element, the LEDs not being visible to an occupant in the interior compartment of the vehicle when not emitting light,
    a second additional wood element on a side door of the vehicle exposed to the interior compartment of the vehicle, the second additional wood element having a thickness that causes it to be translucent, a second additional elongate housing arranged on an underside of the second additional wood element on the dashboard and being open on a side adjacent the second additional wood element, and a plurality of light emitting diodes (LEDs) arranged one behind another and spaced apart from one another in the second additional elongate housing to form, when emitting light, a linear illumination that is visible in the interior compartment of the vehicle through the second additional wood element, the LEDs not being visible to an occupant in the interior compartment of the vehicle when not emitting light, the LEDs in the elongate housing, the first additional elongate housing and the second additional elongate housing being arranged to form, when emitting light, a substantially continuous linear illumination that extends along the center console, in an outward curve at a front on the dashboard and along the side door.

15. The illumination device according to claim 14, further comprising
a third additional wood element on the center console of the vehicle exposed to an interior compartment of the vehicle, the third additional wood element having a thickness that causes it to be translucent,
a third additional elongate housing arranged on an underside of the third additional wood element on the dashboard and being open on a side adjacent the third additional wood element, and
a plurality of light emitting diodes (LEDs) arranged one behind another and spaced apart from one another in the third additional elongate housing to form, when emitting light, a linear illumination that is visible in the interior compartment of the vehicle through the third additional wood element and parallel to the linear illumination through the wood element on the center console, the LEDs in the third additional elongate housing not being visible to an occupant in the interior compartment of the vehicle when not emitting light.

16. The illumination device according to claim 1, wherein the wood element is on a center console of the vehicle, the illumination device further comprising:
a wood strip on the center console; and
control buttons equipped with illuminations on a rear side of the wood strip and which are operable by finger pressure on the wood strip.

17. The illumination device according to claim 16, wherein the wood strip is angled to a side of the wood element such that the control buttons are manually operable by an occupant in a seat of the vehicle.

18. The illumination device according to claim 16, wherein the wood strip has a thickness of approximately a few tenths of a millimeter to a few millimeters to provide sufficient strength for the wood element and maintain translucency of the wood element.

19. The illumination device according to claim 1, wherein the wood element has a thickness of approximately a few tenths of a millimeter to a few millimeters to provide sufficient strength for the wood element and maintain translucency of the wood element.

20. The illumination device according to claim 1, wherein the wood element is in the form of a veneer provided with a correspondingly translucent thickness.

* * * * *